Patented Dec. 14, 1948

2,456,188

UNITED STATES PATENT OFFICE 2,456,188

CYANHYDRIN ESTERS

Virgil L. Hansley and John E. Bristol, Niagara Falls, N. Y., assignors to E. I. du Pont de Nemours & Company, Wilmington, Del., a corporation of Delaware No Drawing. Application June 23, 1945, Serial No. 601,320

12 Claims. (Cl. 260—345)

This invention relates to the production of esters of cyanhydrins and more particularly to a novel process for the production of acetic esters of cyanhydrins.

The esters of cyanhydrins are useful compounds, particularly for the synthesis of other organic compounds. Certain cyanhydrin esters have been used, for example, for the production of cyanobutadiene. These esters are ordinarily prepared by reacting hydrocyanic acid with an aldehyde or ketone to produce the cyanhydrin which is then acylated at elevated temperatures. In conventional methods different catalysts are used in the formation of the cyanhydrin and the acylation, and it has hitherto been considered necessary to carry out the acylation at elevated temperatures, usually at the boiling point of the reaction mixture. For example, in one prior art method the cyanhydrin is acetylated with acetic anhydride at the boiling point in the presence of sulfuric acid as a catalyst. Similarly, acylations have also been carried out utilizing acyl chlorides.

The use of different catalysts in the two steps leading to the formation of the cyanhydrin ester complicates the method and obviously makes more difficult continuous operation. Also the high temperatures which have always been considered essential for acetylation are disadvantageous in that some cyanhydrins tend to undergo polymerization, and the polymerization reaction is accelerated by increased temperatures. Furthermore, many cyanhydrins are relatively unstable and cannot be isolated as such but must be converted to esters as rapidly as formed. The esters of cyanhydrins of this type cannot be obtained in appreciable yields by prior art methods because of decomposition into hydrocyanic acid and the aldehyde or ketone upon heating to the temperature required for acetylation.

It is one of the objects of this invention to provide a new and improved process for the production of acetic esters of cyanhydrins. Another object is to provide a process for the production of acetic esters of cyanhydrins which is suitable for continuous low-temperature operation. A further object of the invention is to provide a new catalyst for the acetylation of cyanhydrins. One of the specific objects is to provide a process for the acetylation of unstable cyanhydrins which cannot be effectively acetylated by prior art methods. These and other objects will be apparent from the ensuing description of the invention.

The above objects are attained in accordance with this invention which comprises reacting a cyanhydrin with acetic anhydride in the presence of triethylamine.

We have discovered that when triethylamine is utilized at a catalyst the acetylation proceeds rapidly and completely at low temperatures, for example room temperature, to produce high yields of the desired cyanhydrin acetate. We have also discovered that by utilizing our novel catalyst these esters may be continuously produced starting with a suitable aldehyde or ketone which is reacted with hydrocyanic acid and immediately thereafter reacting the cyanhydrin obtained with acetic anhydride, utilizing triethylamine as the catalyst for both stages of the process.

In general, the process of this invention may be carried out batchwise or in a continuous manner. Cyanhydrins previously prepared or obtained from other sources may be acetylated in accordance with this invention, or esters may be produced directly from the cyanhydrins as formed.

In one mode of carrying out our process, the cyanhydrin, acetic anhydride, and triethylamine are passed into a reaction vessel equipped with cooling means and containing an inert liquid as the reaction medium. The exothermic reaction begins immediately, and the temperature is preferably maintained within the range of about 20° to 40° C., either by regulating the cooling means, the rate of addition of catalyst, or combination thereof.

In a preferred method of operating the invention, we utilize the cyanhydrin acetate as the reaction medium as we have found that particularly good results are obtained in this manner. Other liquids may be utilized as the reaction medium, providing these liquids are inert toward the reactants and the product. However, we prefer to use a cyanhydrin acetate corresponding to the acetate which it is desired to produce, as we have found that excellent results are thus obtained, and this procedure simplifies the process, particularly when it is desired to operate in a continuous manner. Furthermore, utilization of the cyanhydrin acetate as the reaction medium obviates the necessity of isolating the product from the reaction medium.

The following examples illustrate our invention:

*Example 1*

An apparatus was arranged which consisted of a vertical steel coil immersed in a cooling bath. The bottom outlet of the coil was connected to a circulating pump which in turn was connected to a reservoir situated on a level above the inlet of the coil. The bottom of the reservoir was connected to the inlet of the coil so as to provide for recirculation of the contents. The upper part of the reservoir was provided with an overflow which was connected to the inlet of a second system identical with the foregoing, except that the overflow of the reservoir in the second system led directly to a receiver for the product. The inlets of the coils in both systems were also provided with connections for the controlled addition of reactants and catalyst.

The first system was filled with crotonaldehyde cyanhydrin and the second with crotonaldehyde cyanhydrin acetate. Crotonaldehyde (400 g.), hydrocyanic acid (75 g.), and triethylamine (7 g.) were started at equivalent rates into the first reaction system. The rate of addition was such that 16 minutes were required for the total amount of reactants to pass through the system. The tempertaure was maintained at approximately 0.5° C.

The crotonaldehyde cyanhydrin formed in the first reaction system overflowed into the inlet of the coil in the second or acetylation system at which point 80 g. of acetic anhydride and 5 g. additional triethylamine was added for 72.6 g. of crotonaldehyde cyanhydrin entering. The temperature during acetylation was maintained at 30-40° C. Most of the acetic acid was removed from the product by distillation. The triethylamine formed an azeotrope with the remainder of the acetic acid, having a boiling point of 160° to 162° C. The triethylamine was returned to the acetylation system as the triethylamine-acetic acid azeotrope. The yield of crotonaldehyde cyanhydrin acetate distilling at 95 to 98° C. at 20 mm. pressure was 98.5 per cent based on the crotonaldehyde charged.

*Example 2*

The procedure used in Example 1 was repeated, except that 320 g. of aectic anhydride was added in the acetylation stage for 290 g. of crotonaldehyde cyanhydrin entering the system, and 50 g. additional triethylamine was added to increase the acetylation rate to equal the rate of formation of the cyanhydrin in the first stage. The yeild of crotonaldehyde cyanhydrin acetate was 96 per cent.

*Example 3*

Furfural (96 g.) was reacted with 27 g. of hydrocyanic acid using 0.02 g. of potassium cyanide as catalyst in a vessel equipped for efficient cooling. The temperature was maintained at 0° C. Upon completion of the reaction 10 g. of triethylamine as the triethylamine-acetic acid azeotrope was added with 102 g. of acetic anhydride. The temperature during acetylation was maintained at 75° C. during 45 minutes. Furfuryl cyanhydrin acetate (133 g.) boiling at 91° to 93° C. at 3 mm. pressure and having a specific gravity of 1.175 at 24° C. was isolated from the reaction mixture.

*Example 4*

The procedure of Example 3 was followed except that 380 g. of 37% aqueous formaldehyde was reacted with 135 g. of hydrocyanic acid using 0.05 g. of potassium cyanide as catalyst. The cyanhydrin produced was reacted with 400 g. of acetic anhydride in the presence of 40 g. of triethylamine-acetic acid azeotrope. A good yield of glycolonitrile acetate boiling at 177-180° C. at atmospheric pressure was obtained.

When various other aldehydes or ketones are substituted in the foregoing examples, for instance, benzaldehyde, acetaldehyde, acetone, or acetophenone, high yields of the corresponding cyanhydrin acetate are obtained.

Other cyanhydrin acetates which may be produced in accordance with this invention include the cyanhydrin acetates of acetoacetic ester, diacetyl, vanillin, veratraldehyde, diacetone alcohol, methyl amyl ketone, aldol, piperonal, butyraldehyde, mesityl oxide, acetyl acetone, methyl isopropyl ketone, acetoin, aldol acetate, and acetonyl acetone.

The concentration of triethylamine may be varied considerably with satisfactory results. However, we have found that concentrations of less than about 1.0 per cent by weight of triethylamine based on the weight of cyanhydrin are insufficient generally to produce a practical rate of acetylation. Concentrations of triethylamine in excess of 50 per cent may be used, although higher concentrations fail to produce any advantages and increase the time and labor required for the recovery of the catalyst. We prefer to utilize concentrations of triethylamine of about 5 to about 20 per cent by weight based on the weight of cyanhydrin to be acetylated. Within this preferred range of catalyst concentration, it is possible readily to adjust the rate of acetylation as desired and in general, optimum results are obtained within this range.

The triethylamine catalyst may be recovered and reused as such by neutralization and distillation. However, we have found it preferable to utilize the triethylamine-acetic acid azeotrope which forms immediately upon contact with acetic acid formed during the acetylation. This azeotrope, boiling at 160° to 162° C. at atmospheric pressure provides a convenient means of utilizing the triethylamine as it is readily recovered from the reaction mixture by distillation.

When the method illustrated in Example 1 is utilized to produce the ester, starting with the aldehyde or ketone, sufficient triethylamine may be added in the first stage to maintain the reaction mixture alkaline. In the acetylation stage additional quantities of triethylamine are preferably added in order to increase the reaction rate. By suitable adjustment of the triethylamine concentration in the acetylation stage the rate of acetylation can be controlled so as to equal the rate of formation of cyanhydrin.

Catalysts other than triethylamine may be used in the first stage for the formation of the cyanhydrin if desired. For example, alkali metal cyanides or hydroxides may be utilized in concentrations sufficient to maintain the reaction mixture alkaline. However, we prefer to use triethylamine as catalyst in both the formation and acetylation stages particularly when carrying out the production of the cyanhydrin acetate continuously.

The reaction to form the cyanhydrin and the acetylation reaction are exothermic and generally efficient cooling means is required to maintain the preferred operating temperatures. In the reaction between an aldehyde or ketone to form the cyanhydrin which it is desired to acetylate, the preferred operating temperature is within the range 0° to 10° C. Higher temperatures, although not inoperable, are usually undesirable as decomposition of the cyanhydrin may occur resulting in lowered yields of the desired product. On the other hand, temperatures below 0°

C. usually are too low for a satisfactory rate of reaction.

We have found that optimum results are obtained in acetylating a cyanhydrin when the temperature is maintained at about 20° C. to 40° C. We have discovered that these low temperatures are generally desirable in carrying out the acetylation of any cyanhydrin, since decomposition and other side reactions are avoided, but low temperature operation is especially useful in the acetylation of the cyanhydrins which are relatively unstable, for example crotonaldehyde cyanhydrin and formaldehyde cyanhydrin. In attempting to acetylate unstable cyanhydrins of this type by prior art acetylation techniques decomposition losses are extremely high, whereas in accordance with this invention, the use of triethylamine as catalyst makes possible the operation of the acetylation at low temperatures as contrasted with the high temperatures previously required.

The advantages and utility of our invention will be apparent to those skilled in the art. Our novel process provides a means for the production of cyanhydrin acetates in high yield on any desired scale of operation. The process is simple to operate and the unexpected efficacy of triethylamine as a catalyst for the acetylation reaction makes possible the rapid, economical, and continuous production of cryanhydrin esters, including those obtained from cyanhydrins so unstable as to make their acetylation by prior art methods impractical.

We claim:

1. The process for the production of a cyanhydrin acetate which comprises reacting a cyanhydrin with acetic anhydride in the presence of triethylamine.

2. The process for the production of a cyanhydrin acetate which comprises reacting a cyanhydrin with acetic anhydride in the presence of triethylamine at a temperature of about 20° to 40° C.

3. The process for the production of crotonaldehyde cyanhydrin acetate which comprises reacting crotonaldehyde cyanhydrin with acetic anhydride in the presence of triethylamine.

4. The process for the production of glycolonitrile acetate which comprises reacting glycolonitrile with acetic anhydride in the presence of triethylamine.

5. The process for the production of furfuryl cyanhydrin acetate which comprises reacting furfuryl cyanhydrin with acetic anhydride in the presence of triethylamine.

6. The process for the production of crotonaldehyde cyanhydrin acetate which comprises reacting crotonaldehyde cyanhydrin with acetic anhydride in the presence of about 5% to about 20% of triethylamine based on the weight of crotonaldehyde cyanhydrin at temperature of about 20° to 40° C.

7. The process for the production of glycolonitrile acetate which comprises reacting glycolonitrile with acetic anhydride in the presence of about 5% to about 20% of triethylamine based on the weight of glycolonitrile at a temperature of about 20° to 40° C.

8. The process for the production of furfuryl cyanhydrin acetate which comprises reacting furfuryl cyanhydrin with acetic anhydride in the presence of about 5% to about 20% of triethylamine based on the weight of furfuryl cyanhydrin at a temperature of about 20° to 40° C.

9. A continuous process for the production of a cyanhydrin acetate which comprises continuously reacting a compound selected from the group consisting of aldehydes and ketones with hydrocyanic acid at a temperature of about 0° to 10° C. in the presence of triethylamine in an amount sufficient to maintain the reaction mixture alkaline, the reaction medium comprising a cyanhydrin, continuously flowing the mixture resulting from said reaction into a separate vessel and immediately reacting it with acetic anhydride in the presence of about 5% to 20% of triethylamine at a temperature of about 20° to 40° C., the reaction medium comprising a cyanhydrin acetate.

10. A continuous process for the production of crotonaldehyde cyanhydrin acetate which comprises continuously reacting crotonaldehyde with hydrocyanic acid at a temperature of about 0° to 10° C. in the presence of triethylamine in an amount sufficient to maintain the reaction mixture alkaline, the reaction medium comprising crotonaldehyde cyanhydrin, continuously flowing the mixture resulting from said reaction into a separate vessel and immediately reacting it with acetic anhydride in the presence of about 5% to 20% of triethylamine at a temperature of about 20° to 40° C., the reaction medium comprising crotonaldehyde cyanhydrin acetate.

11. A continuous process for the production of glycolonitrile acetate which comprises continuously reacting formaldehyde with hydrocyanic acid at a temperature of about 0° to 10° C. in the presence of triethylamine in an amount sufficient to maintain the reaction mixture alkaline, the reaction medium comprising glycolonitrile, continuously flowing the mixture resulting from said reaction into a separate vessel and immediately reacting it with acetic anhydride in the presence of about 5% to 20% of triethylamine at a temperature of about 20° to 40° C., the reaction medium comprising glycolonitrile acetate.

12. A continuous process for the production of furfuryl cyanhydrin acetate which comprises continuously reacting furfural with hydrocyanic acid at a temperature of about 0° to 10° C. in the presence of triethylamine in an amount sufficient to maintain the reaction mixture alkaline, the reaction medium comprising furfuryl cyanhydrin, continuously flowing the mixture resulting from said reaction into a separate vessel and immediately reacting it with acetic anhydride in the presence of about 5% to 20% of triethylamine at a temperature of about 20° to 40° C., the reaction medium comprising furfuryl cyanhydrin acetate.

VIRGIL L. HANSLEY.
JOHN E. BRISTOL.

REFERENCES CITED

The following references are of record in the file of this patent:

UNITED STATES PATENTS

| Number | Name | Date |
|---|---|---|
| 2,101,823 | Dittmar | Dec. 7, 1937 |
| 2,222,363 | Claborn | Nov. 19, 1940 |
| 2,265,814 | Ritchie et al. | Dec. 9, 1941 |
| 2,342,612 | Hansley | Feb. 22, 1944 |
| 2,379,297 | Harmon et al. | June 26, 1945 |

FOREIGN PATENTS

| Number | Country | Date |
|---|---|---|
| 452,285 | Great Britain | Jan. 16, 1936 |
| 460,464 | Great Britain | Jan. 28, 1937 |